US010645869B2

(12) United States Patent
Roach et al.

(10) Patent No.: US 10,645,869 B2
(45) Date of Patent: *May 12, 2020

(54) SKID-MOUNTED BOOM CRADLES FOR AN AGRICULTURAL PRODUCT SPRAYER

(71) Applicant: CNH Industrial America LLC, New Holland, PA (US)

(72) Inventors: William A. Roach, Lake Lillian, MN (US); Rex L. Ruppert, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/783,443

(22) Filed: Oct. 13, 2017

(65) Prior Publication Data

US 2019/0110393 A1    Apr. 18, 2019

(51) Int. Cl.
| | | |
|---|---|---|
| *A01C 23/04* | (2006.01) | |
| *B05B 9/00* | (2006.01) | |
| *A01M 7/00* | (2006.01) | |
| *B05B 1/20* | (2006.01) | |
| *A01M 21/04* | (2006.01) | |

(52) U.S. Cl.
CPC ......... *A01C 23/047* (2013.01); *A01M 7/0082* (2013.01); *B05B 9/007* (2013.01); *A01M 7/0075* (2013.01); *A01M 21/043* (2013.01); *B05B 1/20* (2013.01)

(58) Field of Classification Search
CPC .............. A01M 7/0042; A01M 7/0053; A01M 7/0057; A01M 7/0071; A01M 7/0075; A01M 7/0082; A01M 21/043; A01C 23/047; B05B 9/007; B05B 1/20
See application file for complete search history.

(56) References Cited

U.S. PATENT DOCUMENTS

| | | | |
|---|---|---|---|
| 3,556,404 A | * | 1/1971 | Walker ................ A01M 7/0075 239/167 |
| 3,887,129 A | | 6/1975 | Brown |
| 3,887,132 A | * | 6/1975 | Widmer .................. A01M 7/00 239/166 |
| 4,643,358 A | | 2/1987 | Jackson |
| 4,673,130 A | | 6/1987 | Simpson |
| 4,768,715 A | | 9/1988 | Sali et al. |
| 4,854,503 A | | 8/1989 | Little et al. |
| 5,000,385 A | | 3/1991 | Trusty et al. |
| 5,284,297 A | | 2/1994 | Kubacak et al. |

(Continued)

FOREIGN PATENT DOCUMENTS

EP          0092951          11/1983

*Primary Examiner* — Darren W Gorman
(74) *Attorney, Agent, or Firm* — Rebecca L. Henkel; Rickard K. DeMille

(57) ABSTRACT

An apparatus and method are provided for removably mounting an agricultural product sprayer, having at least one foldable boom, on an agricultural product applicator having a chassis adapted for removably receiving the agricultural product sprayer, by attaching the foldable boom to a skid adapted for operative, removable mounting on the applicator chassis. The skid further has a boom cradle adapted for supporting the foldable boom in a folded position when the skid is mounted on the chassis, and when the skid is separated from the chassis of the agricultural applicator.

15 Claims, 3 Drawing Sheets

(56) References Cited

U.S. PATENT DOCUMENTS

| | | | | |
|---|---|---|---|---|
| 5,954,270 | A * | 9/1999 | Rosset | A01M 7/0075 |
| | | | | 239/159 |
| 6,413,012 | B1 | 7/2002 | Jones | |
| 8,091,799 | B2 | 1/2012 | Honermann et al. | |
| 8,985,532 | B2 | 3/2015 | Chirpich et al. | |
| 9,010,659 | B2 | 4/2015 | Bouten | |
| 2006/0011741 | A1 * | 1/2006 | Hahn | A01M 7/0064 |
| | | | | 239/172 |
| 2006/0045715 | A1 * | 3/2006 | Honermann | A01M 7/005 |
| | | | | 414/723 |
| 2006/0163381 | A1 | 7/2006 | Balmer | |
| 2012/0043396 | A1 * | 2/2012 | Joris | A01M 7/0053 |
| | | | | 239/164 |
| 2015/0375247 | A1 | 12/2015 | Funseth et al. | |
| 2016/0038961 | A1 | 2/2016 | Carlson et al. | |
| 2016/0221032 | A1 * | 8/2016 | Whiting | B05B 5/08 |

* cited by examiner

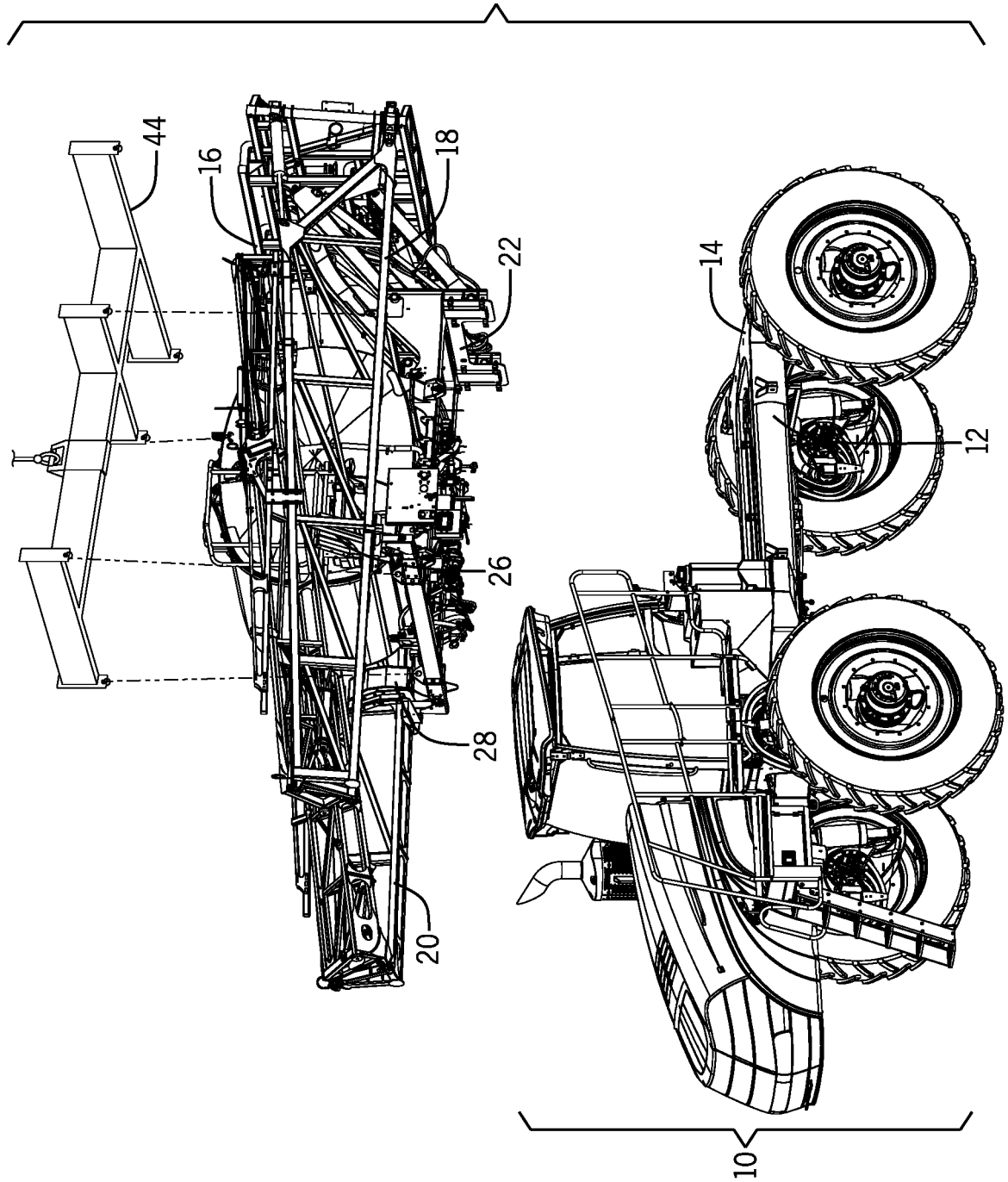

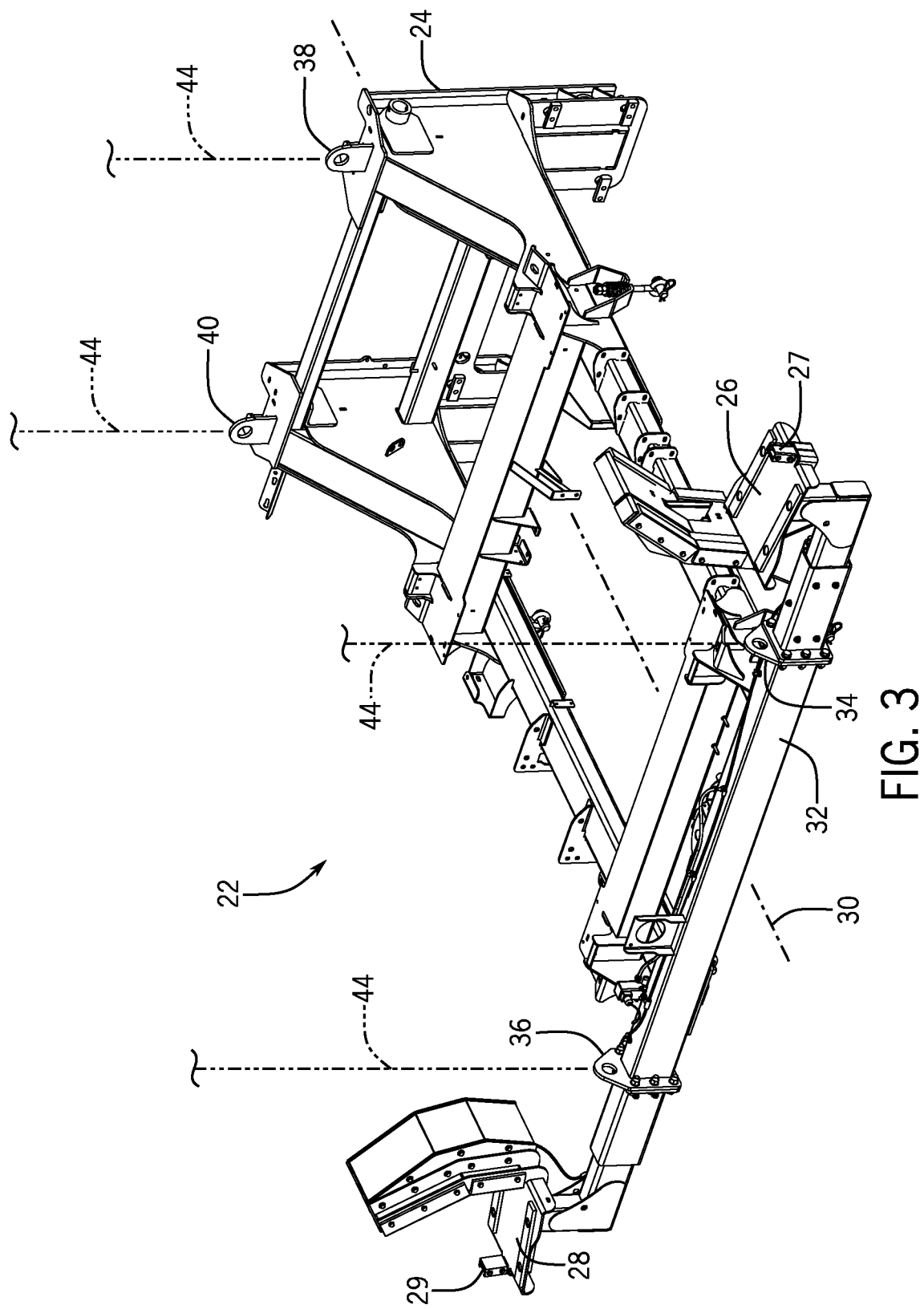

SKID-MOUNTED BOOM CRADLES FOR AN AGRICULTURAL PRODUCT SPRAYER

FIELD OF THE INVENTION

This invention generally relates to agricultural product applicators, and more particularly to removably mounting an agricultural product sprayer, having one or more foldable booms, on the chassis of an agricultural product applicator.

BACKGROUND OF THE INVENTION

Modern agricultural practices rely heavily on timely application of agricultural products such as fertilizers and chemicals. Some of these products are applied in dry form using dry product spreading equipment, and others are applied in liquid form using sprayers.

It is advantageous to mount the dry and liquid product application equipment on separate skids that can be interchangeably mounted on the same product applicator. Such skid-mounted equipment is typically large in size and heavy, weighing as much as several thousand pounds. Lifting the skid-mounted equipment into place typically requires the use of some sort of lifting arrangement.

Liquid product application sprayer equipment typically includes foldable booms that may span 140 feet, or more, when extended. These booms are usually placed in their folded position during installation and removal of the skid mounted sprayer.

Prior skid-mounted sprayer equipment has not included provisions on the skid for securing the foldable booms during installation, removal, and off-machine storage of the skid mounted sprayer equipment. This has required the use of additional securing straps or snubbers, to hold the folded booms in a safe and desirable position during installation, removal, and off-machine storage. The necessity for such additional equipment makes the processes of installation, removal and storage of the sprayer increases the time and effort that is required to install and remove of the sprayer.

It is desirable, therefore, to have an improved method and apparatus for supporting the folded booms during the installation and removal process, and during off-machine storage of the sprayer. It is also desirable that such improved boom support methods and apparatuses be usable for supporting the folded booms when the sprayer equipment is mounted on the applicator. It is further desirable, in some instances, that such improved boom support methods and apparatuses include provisions for locking the folded booms in place to facilitate operation of the applicator and installation and removal of the sprayer.

BRIEF SUMMARY OF THE INVENTION

The invention provides an apparatus and method for removably mounting an agricultural product sprayer, having at least one foldable boom, on an agricultural product applicator having a chassis adapted for removably receiving the agricultural product sprayer, by attaching the foldable boom to a skid adapted for operative, removable mounting on the applicator chassis. The skid further has a boom cradle adapted for supporting the foldable boom in a folded position when the skid is mounted on the chassis, and when the skid is separated from the chassis of the agricultural applicator. As a result of this configuration, installation and removal of the sprayer from the chassis is facilitated.

In some forms of the invention, the skid may include lifting arrangement attachment elements, adapted for attachment of a lifting arrangement for mounting the sprayer on, and removing the sprayer from the chassis. Some forms of the invention may further include a boom lock for securing the folded boom in the boom cradle.

The skid may define a longitudinal axis of the skid and a first end of the skid disposed along the longitudinal axis of the skid and adapted for attachment to the first end of the foldable boom. The boom cradle may be disposed at an opposite longitudinal end of the skid.

In some forms of the invention, the first end of the skid is a rear end of the skid, and the opposite end of the skid is a front end of the skid when the sprayer is mounted on the chassis of the applicator.

In some forms of the invention, where the sprayer includes left and right foldable booms, the skid may include left and right boom cradles adapted for respectively supporting the left and right foldable booms in their folded positions when the skid is mounted on the chassis and when the skid is separated from the chassis of the agricultural applicator.

In one form of the invention, an agricultural product sprayer is provided for an agricultural product applicator having a chassis adapted for removably receiving the agricultural product sprayer. The agricultural product sprayer includes a skid, according to the invention, adapted for operative removable connection to the applicator chassis, and further adapted for attachment to the skid of a foldable boom of the sprayer. The skid includes a boom cradle, according to the invention, adapted for supporting the foldable boom in a folded position when the skid is mounted on the chassis, and when the skid is separated from the chassis of the agricultural applicator.

The invention may also take the form of an agricultural applicator having a chassis including a bed adapted for removable mounting on the bed of an agricultural product sprayer having at least one foldable boom. The agricultural product sprayer includes a skid, according to the invention, adapted for operative removable connection to the applicator chassis, and further adapted for attachment to the skid of the foldable booms. The skid may include a boom cradle, according to the invention, adapted for supporting the foldable boom in a folded position when the skid is mounted on the chassis, and when the skid is separated from the chassis of the agricultural applicator.

A method, according to the invention, may include attaching the foldable boom of an agricultural product sprayer to a skid that is adapted for operative removable mounting on a chassis of an agricultural product applicator, with the skid including a boom cradle adapted for supporting the foldable boom in a folded position when the skid is mounted on the chassis, and when the skid is separated from the chassis of the agricultural applicator. The method may also include supporting the foldable boom in the boom cradle during mounting of the skid on, and removal of the skid from the applicator chassis.

In forms of the invention where the skid includes lifting arrangement attachment elements, adapted for attachment of a lifting arrangement for mounting the sprayer on, and removing the sprayer from the chassis, a method may further include attaching a lifting arrangement to the attachments of the skid for mounting the sprayer on and removing the sprayer from the chassis. Where the boom cradles include a boom lock for securing the folded boom in the boom cradle, a method may further include locking the folded boom to the boom to the boom cradle with the boom lock.

Other aspects, objects and advantages of the invention will be apparent from the following detailed description and drawings of exemplary embodiments of the invention.

BRIEF DESCRIPTION OF THE DRAWINGS

The accompanying drawings incorporated in and forming a part of the specification illustrate several aspects of the present invention and, together with the description, explain the invention. In the drawings:

FIG. 2 is an isometric illustration showing the sprayer being lifted off of a chassis of the applicator of FIG. 1, using a lifting arrangement, while the folded booms are supported in the boom cradles attached to the skid; and FIG. 3 is an isometric illustration of the skid of the exemplary embodiments of the applicator and sprayer of FIGS. 1 and 2.

Figure 1:
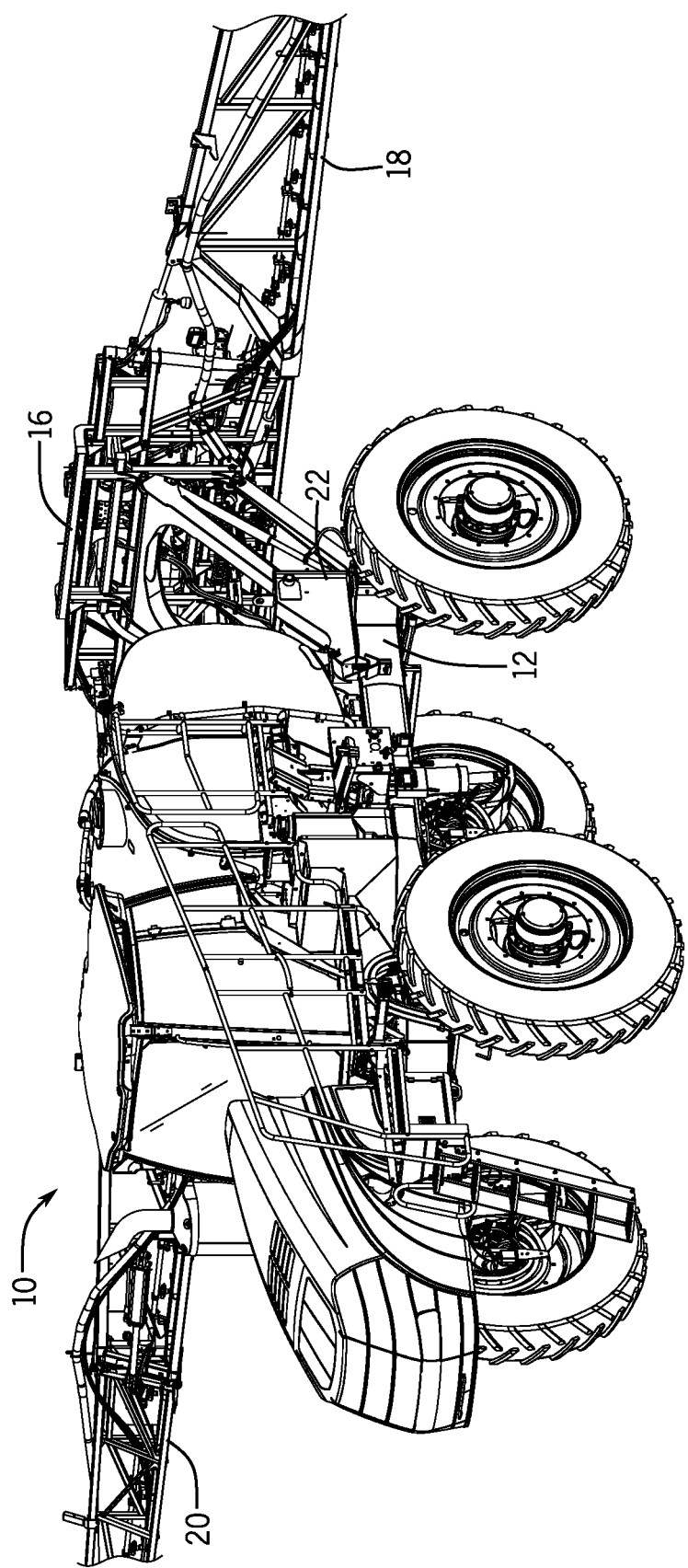
FIG. 1 is an isometric illustration of an exemplary embodiment of the invention in the form of an agricultural product applicator carrying a sprayer with foldable booms mounted on a removable skid having boom cradles attached to the skid for supporting the booms in their folded position.

While the invention is described in connection with certain exemplary embodiments, there is no intent to limit it to those embodiments. On the contrary, the intent is to cover all alternatives, modifications and equivalents within the spirit and scope of the invention.

DETAILED DESCRIPTION OF THE INVENTION

FIG. 1 shows an exemplary embodiment of the invention in the form of an agricultural applicator 10 having a chassis 12 including a bed 14 (see FIG. 2) that is adapted for removable mounting on the bed 14 of an agricultural product sprayer 16 having left and right foldable booms 18,20. The agricultural product sprayer 16 includes a skid 22, according to the invention, that is adapted for operative removable connection to the applicator chassis 12. The rear end 24 (see FIG. 3) of the skid 22 is adapted for operative attachment to the skid 22 of the left and right foldable booms 18,20.

As shown in FIGS. 2 and 3, the skid 22 includes left and right boom cradles 26,28 that are adapted for supporting the left and right foldable booms 18,20 in their folded positions when the skid 22 is mounted on the chassis 12, and also when the skid 22 is separated from the chassis 22 of the agricultural applicator 10.

As shown in FIG. 3, the skid 22 defines a longitudinal axis 30 of the skid 22 and a first end 24 of the skid 22 disposed along the longitudinal axis 30 of the skid 22. The first end 24 is adapted for operative attachment of proximal, first ends of the foldable booms 18,20. The boom cradles 26,28 are located at an opposite longitudinal end 32 of the skid 22, and are adapted for receiving and supporting the distal ends of the folded booms 26,28.

In the exemplary embodiment of the applicator 10 and sprayer 16, the first end 24 of the skid 22 is the rear end 24 of the skid 22, and the opposite end 32 of the skid 22 is the front end 32 of the skid 22 when the sprayer 16 is mounted on the chassis 12 of the applicator 10. It will be understood, however, that in other embodiments of the invention the proximal ends of the booms 16,28 may be mounted to the front of the skid 22, and the boom cradles be positioned at a rear end of the skid 22.

It will also be appreciated that, in the exemplary embodiment of the applicator 10 and sprayer 16, the skid 22 and its attached boom cradles 26,28 are adapted for respectively supporting the left and right foldable booms 18,20 in their folded positions when the skid 22 is mounted on the chassis 12. In addition, because the boom cradles 26,28 are part of the skid 22, they also provide support for the folded booms 18,20 while the sprayer 16 is being lifted off of, or on to the chassis 12 of the applicator 10, as shown in FIG. 2, and also when the sprayer 16 is separated from the chassis 12 of the agricultural applicator 10.

As shown in FIG. 3, the boom cradles 26,28 each include a boom latch, or lock 27,29 for securing the folded booms 18,20 in the cradles 26,28. In various forms of the invention, these latches or locks 27,29 may be configured and actuated in any appropriate manner, such as manually or mechanically, remotely or at the boom cradles 26,28.

As shown in FIGS. 2 and 3, the exemplary embodiment of skid 22 includes lifting arrangement attachment elements, in the form of four lifting eyes 34,36,38,40 that are adapted for attachment of a lifting arrangement 44 for mounting the sprayer 16 on, and removing the sprayer 16 from the chassis 12. The invention may also be practiced with any other appropriate lifting provisions.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An agricultural product sprayer having at least one foldable boom and being connectable to an agricultural product applicator having a chassis adapted for removably receiving the agricultural product sprayer thereon, the agricultural product sprayer comprising:

a skid adapted for operative removable connection to the applicator chassis and for supporting the at least one foldable boom, the skid including a boom cradle adapted for supporting the at least one foldable boom in a folded position when the skid is mounted on the chassis and when the skid is separated from the chassis of the agricultural applicator;

lifting arrangement attachment elements interconnected to the skid; and a lifting arrangement selectively connectable to the lifting arrangement attachment elements, the lifting arrangement configured for removing the sprayer from the chassis.

2. The agricultural product sprayer of claim 1, further including a boom lock for securing the at least one foldable boom in the boom cradle.

3. The agricultural product sprayer of claim 1, wherein:
the skid extends along a longitudinal axis and includes a first end of the skid disposed along the longitudinal axis of the skid and adapted for attachment thereto of the at least one foldable boom; and the boom cradle is disposed at a second end of the skid opposite to the first end of the skid.

4. The agricultural product sprayer of claim 3, further including a boom lock for securing the at least one foldable boom in the boom cradle.

5. The agricultural product sprayer of claim 3, wherein the first end of the skid is a rear end of the skid, and the opposite end of the skid is a front end of the skid when the sprayer is mounted on the chassis of the applicator.

6. The agricultural product sprayer of claim wherein:
the at least one foldable boom includes left and right foldable booms;

the boom cradle is a left boom cradle and the skid further includes a right boom cradle, the left and right boom cradles being adapted for respectively supporting the left and right foldable booms in their folded positions when the skid is mounted on the chassis and when the skid is separated from the chassis of the agricultural applicator;

the skid further includes boom locks for securing the folded left and right foldable booms in their respective boom cradle; and the skid extends along a longitudinal axis and a rear end of the skid is adapted for attachment thereto of the left and right fbldable booms, and the left and right boom cradles are disposed at a front end of the skid for supporting the left and right foldable booms in their folded position.

7. An agricultural product applicator having a chassis including a bed, comprising:
an agricultural product sprayer removably mounted on the bed and having at least one foldable boom, the agricultural product sprayer including:
a skid adapted for operative removable connection to the applicator chassis, the skid including a boom cradle adapted for supporting the at least one foldable boom in a folded position when the skid is mounted on the chassis and when the skid is separated from the chassis of the agricultural applicator;
lifting arrangement attachment elements interconnected to the skid; and
a lifting arrangement selectively connectable to the lifting arrangement attachment elements, the lifting arrangement configured for removing the sprayer front the chassis.

8. The agricultural product applicator of claim 7, further including a boom lock for securing the at least one foldable boom in the boom cradle.

9. The agricultural product applicator of claim 7, wherein:
the skid extends along a longitudinal axis and a first end of the skid is disposed along the longitudinal axis and is adapted for attachment to the at least one foldable boom; and the boom cradle is disposed at a second en.d of the skid opposite to the first end of the skid.

10. The agricultural product applicator of claim 9, further including a boom lock for securing the at least one foldable boom in the boom cradle.

11. The agricultural product applicator of claim 9, wherein the first end of the skid is a rear end of the skid, and the opposite end of the skid is a front end of the skid when the sprayer is mounted on the bed of the chassis of the applicator.

12. The agricultural product applicator of claim 7, wherein:
the at least one foldable boom includes left and right foldable booms;

the boom cradle is a left boom cradle and the skid includes a right boom cradle, the left and right boom cradles being adapted for respectively supporting the left and right foldable booms in their folded positions when the skid is mounted on the chassis and when the skid is separated from the chassis of the agricultural applicator;

the skid further includes boom locks for securing the folded left and right foldable booms in their respective left and right boom cradles; and the skid extends along a longitudinal axis and includes a rear end adapted for attachment to the left and right thldable booms, and the left and right boom cradles are disposed at a front end of the skid for supporting the left and right foldable booms in their folded positions.

13. A method for removably mounting an agricultural product sprayer having at least one foldable boom on an agricultural product applicator, the agricultural product applicator having a chassis adapted for removably receiving the agricultural product sprayer, the method comprising:
attaching the at least one foldable boom to a skid adapted for operative removable mounting on the applicator chassis, the skid including:
lifting arrangement attachment elements; and
a boom cradle adapted for supporting the at least one foldable boom in a folded position when the skid is mounted on the chassis and when the skid is separated from the chassis of the agricultural applicator;
selectively connecting a lifting arrangement to the lifting arrangement attachment elements, the lifting arrangement configured for mounting the skid on and removing the skid from the applicator chassis; and
supporting the at least one foldable boom in the boom cradle during mounting of the skid on and removal of the skid from the applicator chassis.

14. The method of claim 13, wherein the boom cradle further includes a boom lock for securing the a folded one of the at least one foldable boom in the boom cradle, and the method further includes locking the folded one of the at least one foldable boom to the boom cradle with the boom lock.

15. The method of claim 13, wherein;
the skid extends along a longitudinal axis and includes a first end disposed along the longitudinal axis and adapted for attachment thereto of the at least one foldable boom;

and
the boom cradle is disposed at a second end of the skid opposite to the first end of the skid.

* * * * *